United States Patent
Williams

[15] 3,653,550
[45] *Apr. 4, 1972

[54] PLANTING METHOD AND APPARATUS
[72] Inventor: David M. Williams, Salinas, Calif.
[73] Assignee: Bruce Church, Inc., Salinas, Calif.
[*] Notice: The portion of the term of this patent subsequent to Sept. 16, 1986, has been disclaimed.
[22] Filed: Jan. 30, 1969
[21] Appl. No.: 795,321

Related U.S. Application Data
[63] Continuation-in-part of Ser. No. 559,562, June 22, 1966, Pat. No. 3,467,278.

[52] U.S. Cl................................222/136, 222/178, 222/193, 111/6
[51] Int. Cl............................................B67d 5/52
[58] Field of Search..................222/177, 193, 571, 135, 136, 222/178, 144.5, 129; 111/6

[56] References Cited

UNITED STATES PATENTS

| | | | |
|---|---|---|---|
| 3,467,278 | 9/1969 | Williams | 222/1 |
| 600,547 | 3/1898 | Mazzanovitch | 222/193 |
| 1,069,767 | 8/1913 | Clarke | 222/177 |
| 2,609,971 | 9/1952 | Vivolo | 222/193 |
| 2,538,756 | 1/1951 | Braswell | 222/193 |

FOREIGN PATENTS OR APPLICATIONS

| | | | |
|---|---|---|---|
| 616,929 | 8/1935 | Germany | 222/193 |
| 832,854 | 10/1938 | France | 222/177 |
| 21,283 | 11/1895 | Great Britain | 222/571 |

*Primary Examiner*—Evon C. Blunk
*Assistant Examiner*—Hadd S. Lane
*Attorney*—Elwood S. Kendrick, George J. Netter and Kendrick and Subkow

[57] ABSTRACT

Seeds to be planted are gravity fed from a hopper to a substantially horizontal portion of an outlet tubing. At the appropriate time a blast of pressurized air ejects a measured amount of seeds into a furrow. Simultaneously, a discrete quantity of vermiculite is gravity fed into a horizontal compartment from which it is also pneumatically ejected with the seeds to form a common mass in the furrow. Subsequently, the vermiculite-seed mass is sprayed with liquid fertilizer and then sprayed with an asphalt stabilizer. A further aspect is the provision of a plurality of such apparatus disposed transversely of the furrows with timed commutators providing planting locations of adjacent furrows in a staggered arrangement.

An improved vermiculite dispensing apparatus is provided for metering the discrete quantity of vermiculite which is pneumatically expelled. The dispenser comprises a vertical delivery tube and a horizontal dispensing tube which join to form a generally inverted T-shaped volumetric measuring structure. The lower rear end of the vertical delivery tube tapers inwardly and extends partially into the dispensing tube.

2 Claims, 5 Drawing Figures

DAVID M. WILLIAMS
INVENTOR.

BY KENDRICK and SUBKOW

ATTORNEYS

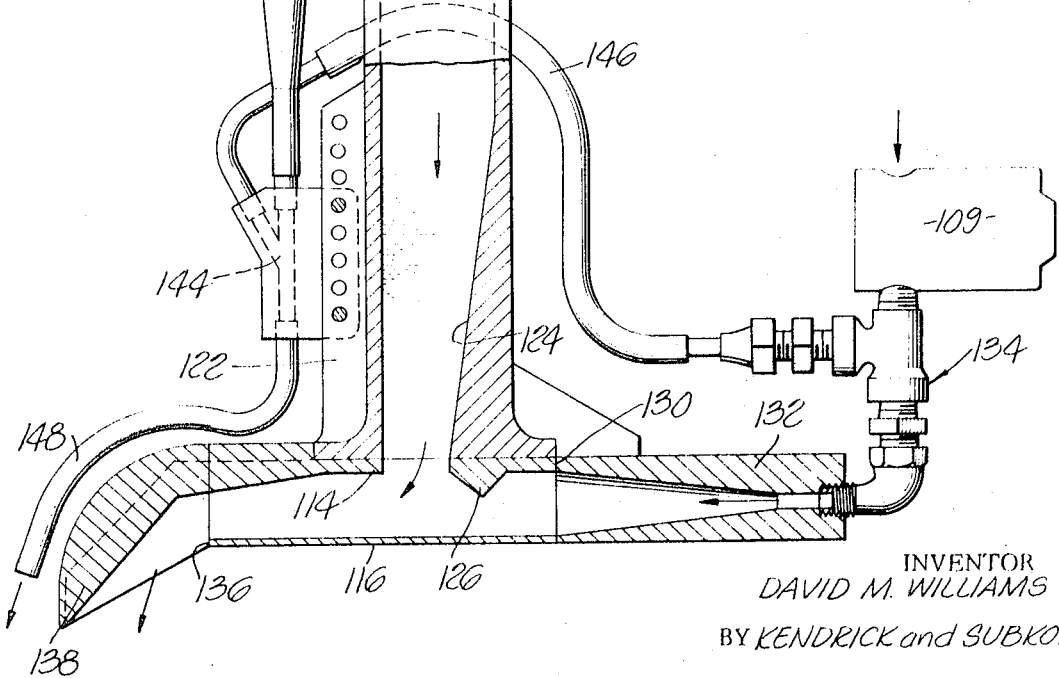

PLANTING METHOD AND APPARATUS

This application is a continuation-in-part of application Ser. No. 559,562, filed June 22, 1966, now U.S. Pat. No. 3,467,278 as of Sept. 16, 1969.

This invention relates to the field of agriculture, and more particularly to the art of planting crops.

The present invention will have many applications other than those disclosed herein. The invention should therefore not be limited to those so disclosed. However, the invention has been found to possess exceptional utility in the planting of a food crop and especially head lettuce, broccoli and the like.

In the past, it has been the practice to plant head lettuce seed in closely spaced relation all along a furrow in the earth. In such a case, it is also conventional to cover the seed with vermiculite to aerate, to facilitate germination and to prevent crust formation of the ground over a planted seed after a rain. This is disclosed in U.S. Pat. No. 2,909,867.

The prior art method of planting is disadvantageous for several reasons. Seed is planted very close together in order to insure a full stand. However this is expensive because both seed and vermiculite are expensive and an excessive use of either one is wasteful. Further, after a stand is established, the crop must be thinned out.

It is also a disadvantage of the prior art method that, in most cases, the thinning of the crop must be done by hand labor and this is both costly and time consuming.

If head lettuce were planted by hand, appropriate accurate spacing of heads could be maintained if some care were used in planting. However, it is not economical to plant by hand. That is, head lettuce must be machine planted. Further, if sufficient accuracy could be maintained in machine planting, any thinning could also be done by machine. Thinning is generally a necessity even if the best planting methods are used. The reason for thinning is that more than enough seed must be planted to insure a full stand. However, when several seeds are planted in one location, more than one plant frequently comes up.

Machine planting is difficult because a crosswind can blow seed off course as it is falling out of the machine onto the ground. Wind also often blows both seed and vermiculite completely outside of the furrow.

In order to overcome the wind problem in spreading other materials over the ground, it has been the practice to coat the materials with a stabilizer which is an asphalt emulsion in water. This is disclosed in U.S. Pat. No. 2,844,914. However, such materials are blown through a fog or mist or the like. It is not possible to accurately control the direction in which these materials are blown because they are sticky.

There are also other disadvantages of planting machines of the prior art. For those which utilize seed dispensers including mechanical metering devices and moving parts near the ground, abrasion and wear become problems. Dirt also can cause maintenance problems.

In accordance with the present invention, the above-described and other disadvantages of the prior art are overcome by providing a machine which is operated to plant a few seeds at accurately spaced locations in a furrow.

It is also a feature of the present invention that vermiculite or other bulky organic or inorganic material may be dispensed in individual quantities over the seeds. Due to the periodic method and the accurate spacings which are maintained between seed locations, it is possible, in accordance with the present invention, to save considerable seed and vermiculite. For example, from two to five head lettuce seeds may be planted at one location. In a furrow, the seed locations may be spaced 12 inches apart.

Due to the fact that several seeds are planted at one location in accordance with the present invention, it is still possible for more than one head to grow in the same location. For this reason, the crop must be thinned.

It is a feature of the present invention that the machine thereof is accurately timed or synchronized to deposit one material on top of another. Thus, one machine may be employed to accomplish several functions. For example, in succession, seed may be deposited; vermiculite may be deposited on top of the seed; a liquid fertilizer may be deposited on top of the vermiculite; and a liquid stabilizer may be deposited on top of the fertilizer. All these steps may also be performed in succession and not simultaneously. However, it has been found that with no apparent disadvantage, the seed and vermiculite can be dispensed simultaneously. Further, the use of a machine to accomplish all of these functions is unusually efficient and accurate.

It is an outstanding feature of the present invention that a blast of gas under pressure is employed, namely, air, to deposit the seed and vermiculite. Seed is therefore located in positions which are accurately spaced. Due to the fact that the blast of air carries the seed and vermiculite at a velocity much greater than that of any ambient wind, no crosswind can blow the seed off its course in falling out of the machine into a furrow.

As stated previously, it is possible to employ a stabilizer for the vermiculite and seed. It is in fact an outstanding feature of the present invention that the stabilizer is sprayed on top of the fertilized seed which has been covered with vermiculite. Unlike the prior art method of coating a material with a stabilizer before it is dispensed, the method of the present invention employs a successive step of depositing a stabilizer on the seed.

In accordance with another outstanding feature of the present invention, a vertical gravity feed is employed for seed and vermiculite dispensers. The only force needed, therefore, to operate these dispensers is compressed air and a solenoid valve to allow the air to escape. Due to this construction, the device of the present invention really has no mechanical metering device or moving parts near the ground. Abrasion and wear are therefore kept to a minimum. Further, dirt can cause no serious problem in the maintenance of the equipment because the moving parts in the solenoid valve are in effect self-cleaning because the escape of the compressed air keeps the solenoid valve clean.

The above-described and other advantages of the present invention will be better understood from the following description when considered in connection with the accompanying drawings.

In the drawings which are to be regarded as merely illustrative:

FIG. 4 is a side elevation view, partly in section, of a vermiculite and seed dispensing apparatus useful in the machine shown in FIGS. 1–3; and FIG. 5 is a top plan view of the apparatus shown in FIG. 4

Figure 1:
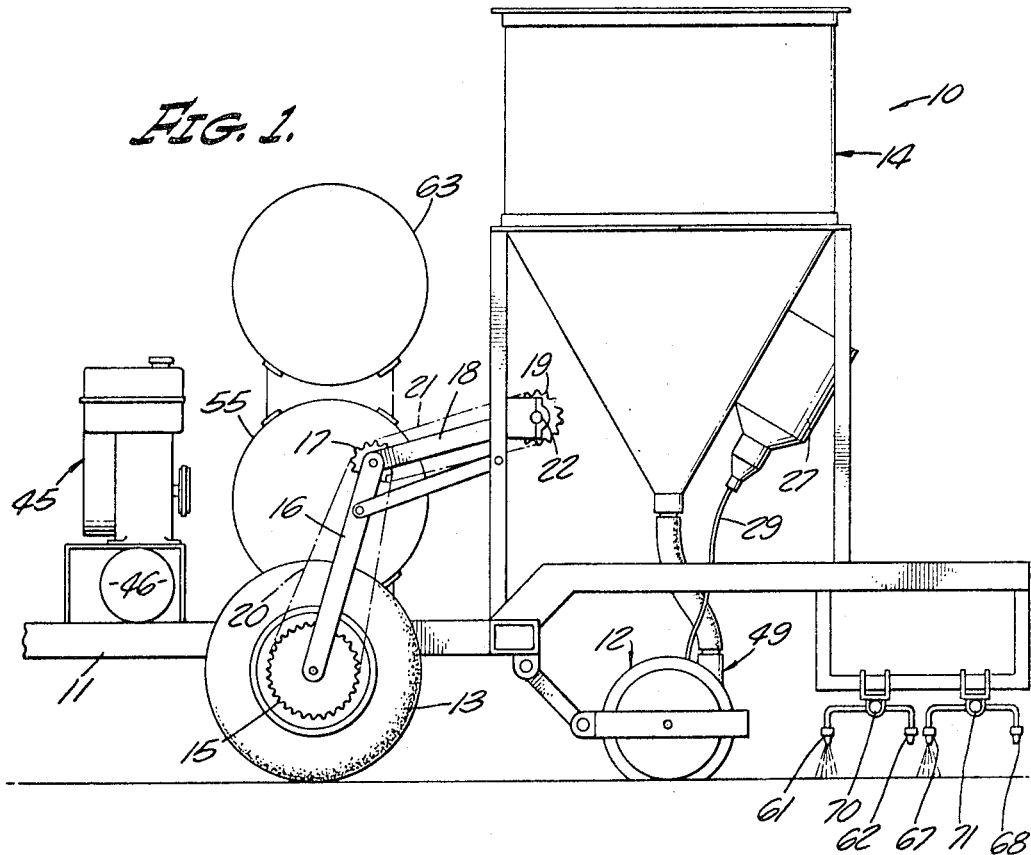
FIG. 1 is a side elevational view of a machine constructed in accordance with one embodiment of the present invention.
Figure 2:
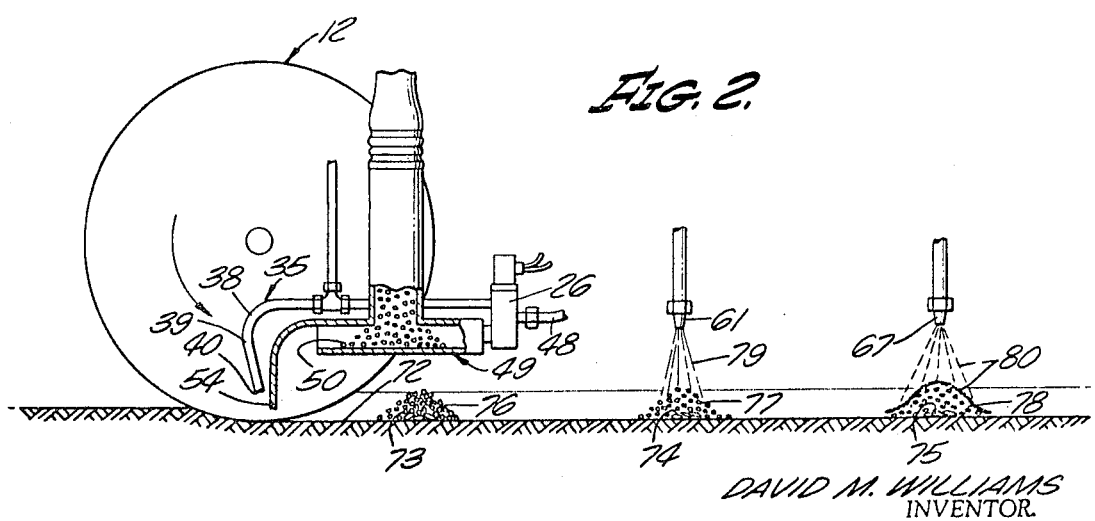
FIG. 2 is a transverse sectional view of a portion of the machine shown in FIG. 1.

The machine of the present invention is indicated at 10 in FIG. 1. Machine 10 is carried on a chassis 11 which may be pulled as a trailer. A pair of disc openers 12 are mounted on chassis 11 for each seed dispenser.

Chassis 11 is supported on a pair of wheels 13, one of which is shown. Chassis 11 may also be supported upon two wheels, not shown, symmetrically below a vermiculite hopper 14 and in longitudinal alignment with wheels 13. An additional pair of wheels may also be employed at each end of hopper 14, if desired.

As shown in FIG. 1, wheel 13 has a sprocket 15 fixed thereto. A linkage 16 extends from the axis of sprocket 15 to the axis of a second sprocket 17. Similarly, a linkage 18 extends from the axis of sprocket 17 to the axis of a third sprocket 19. Sprocket 17 is a double sprocket and receives a chain 20 from around sprocket 15 and a chain 21 from around sprocket 19. Sprocket 19 is keyed to and drives a synchronizing shaft 22 as will be explained.

Figure 3:
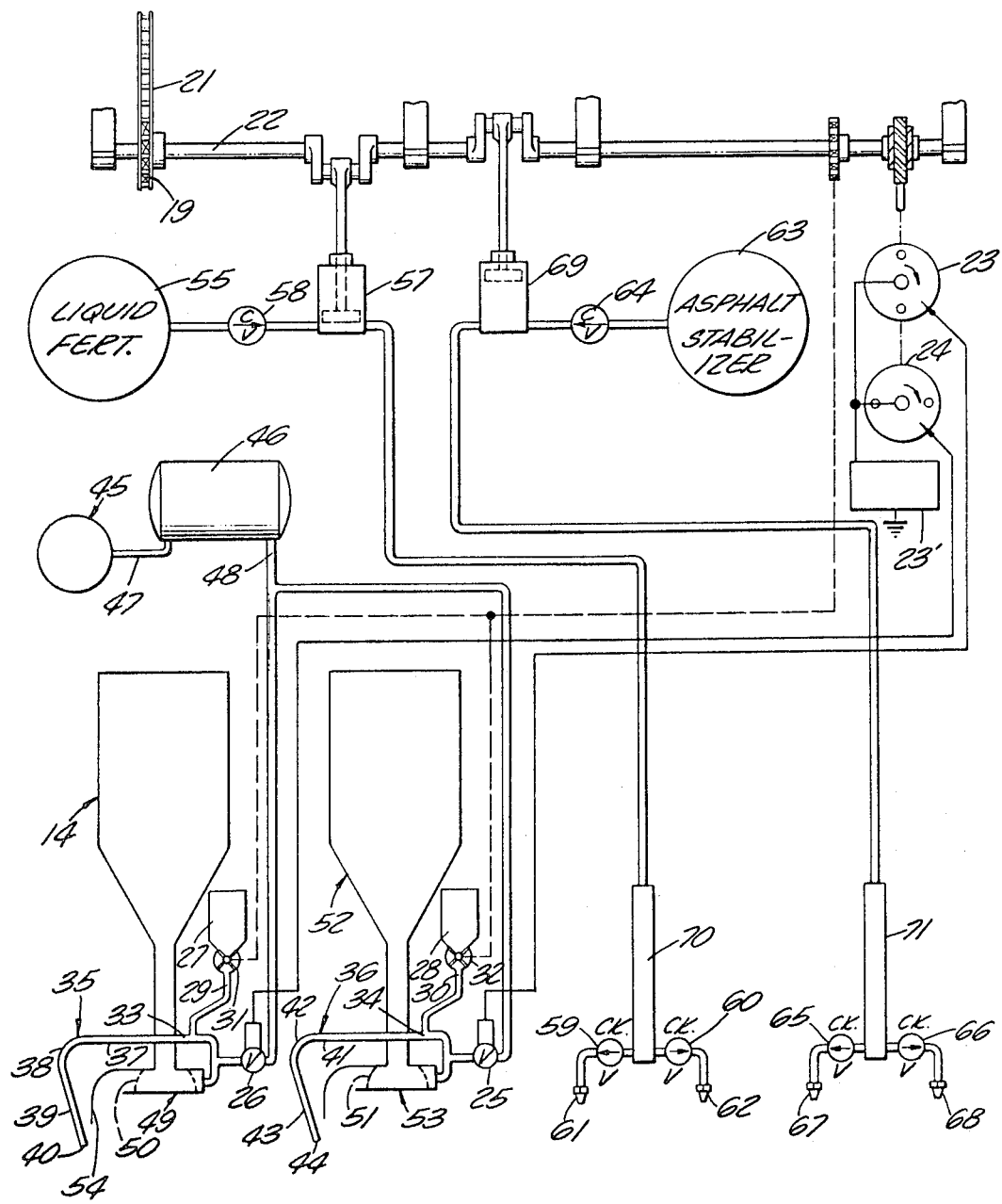
FIG. 3 is a schematic diagram of the machine shown in FIGS. 1 and 2.

Chain 21 and sprocket 19 with shaft 22 are shown in FIG. 3. Shaft 22 rotates a pair of commutators 23 and 24.

The machine 10 of the present invention is employed to plant head lettuce seed in eight adjacent furrows synchronously and at one time. However, structure for planting more than two furrows are identical to the other structures. For this reason, a structure for planting only two adjacent furrows are disclosed in detail.

In particular, commutators 23 and 24 are employed to energize two different sets of solenoid valves so as to plant seed in one furrow six inches longitudinally spaced from seed planted in adjacent furrow. For example, commutator 23 operates solenoid valve 25. Commutator 24 operates solenoid valve 26.

As shown in FIGS. 1 and 3, seed is retained in a seed hopper 27. Two such seed hoppers 27 and 28 are shown in FIG. 3. A few seed are dropped down vertical gravity feed tubes 29 and 30 by two corresponding brush type distributors 31 and 32 which are conventionally geared to shaft 22. Commutators 23 and 24 are also conventionally geared to shaft 22. Commutators 23 and 24 are connected from an electrical source of potential 23'.

As stated previously, a few head lettuce seed are deposited in locations located one food apart in a furrow. Thus, in the travel of the machine 10 one linear foot forward, ample opportunity is provided for distributors 31 and 32 to drop a few head lettuce seed to horizontal surfaces 33 and 34 in tubes 35 and 36, respectively. Tube 35 has a horizontal portion 37, a bend at 38, a downwardly and rearwardly extending portion 39, and an opening 40. Tube 36 has portions 41, 42 43 and 44 identical to portions 37, 38, 39 and 40, respectively, of tube 35.

When machine 10 arrives at a location in which seed should be planted, solenoid valve 26 is normally closed. However, in that position, commutator 24 energizes solenoid valve 26 and allows a blast of air to be expelled through tube 35. This blows the seed from surface 33 out of opening 40 into a furrow. The air is supplied by a compressor 45 which is connected to a tank 46 at 47. Tank 46 is in turn connected to valves 25 and 26 through a pipe 48.

Vermiculite is dispensed at the same time that seed is dispensed. A dispenser 49 is provided for the vermiculite. However, no positive means (such as distributors 31 and 32 which are provided for the seed) are provided to meter the vermiculite into dispenser 49. On the contrary, vermiculite hopper 14 is simply filled to the top and, before it is expelled, occupies the space below the lower end of hopper 14 as indicated at 50 and 51. Alternatively, individual vermiculite hoppers may be provided as indicated at 52 for vermiculite dispenser 53.

When valve 26 is energized, a blast of air is likewise introduced into the dispenser 49. This blows a metered quantity of vermiculite against a deflector 54 and down on the ground covering the seed dispensed from tube 35.

Seed and vermiculite are dispensed in an identical manner through the use of valve 25, except that commutator 23 operates valve 25 at times midway between the operation of solenoid valve 26.

The details of a vermiculite and seed dispensing apparatus 100 particularly adapted for use in the machine 10 is shown in FIGS. 4 and 5. The apparatus 100 includes a vermiculite dispenser 102 having a seed dispenser 104 mounted thereon by brackets 106 and 108. A two way solenoid valve 109 is electrically connected to commutator 23 or 24 (FIG. 3) and selectively admits air under pressure from compressor 45 and tank 46 (FIG. 3) to the vermiculite and seed dispensers 102 and 104 to expel metered quantities of vermiculite and seed in a manner described in detail hereinafter.

The vermiculite dispenser 102 comprises a generally vertically extending delivery tube 110 having an open upper end 112 which receives vermiculite from hopper 14 or 52 (FIG. 3) and a lower end which communicates with a generally horizontally extending dispensing tube 116. Apertured flanges 118, 120 and 122 are provided on the delivery tube for mounting the vermiculite dispenser on a suitable part of the machine 10 and mounting the seed dispenser 104 on the vermiculite dispenser.

As best shown in FIG. 4, the lower rear portion of the delivery tube 110 tapers inwardly at 124 and projects downwardly into the dispensing tube 116 at 126. As will be described more fully hereinafter, the projection 126 and the narrowed lower portion of the delivery tube 110 function to prevent pressurized air from flowing up into the delivery tube when blasts of air are admitted to the dispensing tube to expel vermiculite therefrom.

The rear end 130 of the dispensing tube 116 communicate via a tubular fitting 132, pipe joint 134 and solenoid valve 109 with the air tank 46 and compressor 45 (FIG. 3). The forward end 136 of the dispensing tube 116 is provided with a forwardly and downwardly projecting deflector 138 for directing metered quantities of vermiculite onto the ground.

The seed dispenser 104 includes a generally vertically extending seed delivery tube 140 which narrows at 142 and feeds into one of the upper legs of a generally Y-shaped joint 144. The other upper leg of Y-joint 144 is connected via a tube 146, the pipe joint 134 and solenoid valve 109 to the air tank 46 and the compressor 45 (FIG. 3). The lower leg of Y-joint 144 is connected to a seed dispensing tube 148 which terminates just forward of the vermiculite dispenser deflector 138.

In operation, vermiculite is gravity fed from the vermiculite hopper 14 or 52 (FIG. 3), through the delivery tube 110 and into the dispensing tube 116. The width and depth of the vermiculite dispensing tube 116 and the angle of repose of the vermiculite in the tube form a volumetric measuring device which meters a discrete quantity of vermiculite to be expelled from the dispensing tube when a blast of air is admitted thereto by the solenoid valve 109. Simultaneously, a metered quantity of seed is fed from seed hopper 27 or 28 (FIG. 3) into the upper end of the seed delivery tube 140 by a brush type distributor 31 or 32 (FIG. 3) or other suitable metering means (e.g., a simple rotating flat plate, now shown). The seed drops through the Y-joint 144 and onto the horizontally extending portion of the seed dispensing tube 148. When the solenoid valve 109 is energized by the commutator 23 or 24, blasts of air under pressure will be admitted through pipe joint 134 and tubes 132 and 146 to the vermiculite and seed dispensing tubes 116 and 148, respectively, to expel the vermiculite and seed onto the ground in a substantially unitary mass. After each blast of air, additional measured quantities of vermiculite and seed will drop into their respective dispensing tubes to be expelled by the next air blast. As noted above, each time the vermiculite drops into the vermiculite dispensing tube 116 and reaches a static condition the dimensions of the dispensing tube and the angle of repose of the vermiculite define a measured quantity of vermiculite which will be expelled by the next blast of air. The downwardly extending projection 126 and the tapered lower portion 124 of the vermiculite delivery tube 110 cooperate to direct the air blast through the vermiculite dispensing tube 116 and prevent any significant amount of air from blowing upwardly into the vermiculite delivery tube.

As shown in FIG. 3, liquid fertilizer is dispensed from a tank 55. A piston type positive displacement pump 57 draws the fertilizer from tank 55 through a check valve 58. At the same time, check valves 59 and 60 at nozzles 61 and 62 close. Pump 57 then fills. The fertilizer in pump 57 is forced through check valves 59 and 60 and through nozzles 61 and 62.

Note will be taken that on the chassis 11 of the machine 10, tubes 35 and 36 are not in longitudinal alignment. They are in transverse alignment. The same is true of dispensers 49 and 53.

Similarly, none of the nozzles 61 are in longitudinal alignment with nozzles 62. The reason for this will be apparent hereinafter.

A stabilizer which is an asphalt emulsion in water is dispensed from a tank 63 through check valves 64, 65, and 66, and nozzles 67 and 68. A positive displacement pump 69 identical to pump 57 is employed for this purpose. Pumps 57 and 69 are conventional.

As before, nozzles 67 are not in longitudinal alignment with nozzle 68. Nozzles 67 are employed for one set of furrows.

Nozzles 68 are employed for furrows alternate to those for which nozzles 67 are employed. Similarly, nozzles 62 are employed for furrows which are alternate for those which nozzles 61 are employed. The forward and rear spacing of nozzles 61 and 62 and nozzles 67 and 68 are employed to dispense fertilizer and stabilizer on the same spots in adjacent rows. However, since seed is planted in one furrow midway between where it is planted in an adjacent furrow, and due to the fact that pump 57 dispenses fertilizer from both nozzles 61 and 62 at the same time, nozzles 61 and 62 must be spaced longitudinally apart. The same is true of nozzles 67 and 68.

As shown in FIG. 1, nozzles 61 and 62 are fed by a header 70. Nozzles 67 and 68 are fed by a header 71.

As stated previously, the use of a stabilizer is made to prevent seed and vermiculite from blowing away. Both seed and vermiculite may, in fact, be blown completely out of a furrow in which they are dispensed simply by ambient wind.

In general, the stabilizer should dry to a light cake which can act as a binder to the seed and vermiculite particles. However, the binder cake should not be so firm that it will not eventually break up. None of these stabilizer requirements are critical, and any conventional mulch such as asphalt or any caking or other binder, may be employed for the stabilizer of the present invention.

From the foregoing, it will be appreciated that the method of the present invention including the steps of planting a few head lettuce seeds in accurately spaced locations, is unusually advantageous for several reasons. In the first place, only a few seeds are planted in spaced locations. This saves both seed and vermiculite. Further, any place where more than one head of lettuce grows can be trimmed from the crop. In particular, the crop may be thinned with a minimum amount of hand labor which is a saving both in expense and time. Because of the regular intervals of planting, and the high percentage of plants separate from others, the labor requirements for hand thinning is greatly reduced.

In accordance with an outstanding feature of the present invention, a few head lettuce seed are planted accurately in spaced locations, and the seed are planted by a machine. The accuracy of the planting and the entire mechanization of the operation makes it less expensive and makes it possible to plant at a reasonable rate of speed.

It is also an outstanding feature of the present invention that compressed air in tank 46 is employed to dispense seed from tubes 35 and 36, and to expel vermiculite from dispensers 49 and 53. This accurately places the seed and vermiculite in the furrow indicated at 72 in FIG. 2, where they ought to be. An ambient crosswind therefore cannot blow the seed and vermiculite off course as the seed and vermiculite fall or are blown out of tubes 35 and 36 and dispensers 49 and 53.

After the seeds 73, 74 and 75 have been deposited in furrow 72 and vermiculite 76, 77 and 78 has been deposited on top of seeds 73, 74 and 75, liquid fertilizer at 79 is sprayed on top of the vermiculite and stabilizer 80 is sprayed on top of fertilizer 79. Stabilizer 80 therefore keeps the vermiculite and seed from being blown out of furrow 72.

Further, by applying stabilizer 80 to the fertilized seed and vermiculite, both seed and vermiculite may be moved out of tubes 35 and 36 and leave dispensers 49 and 53 dry. Thus, they may be moved quickly and accurately by the use of compressed air to their particular locations. In this regard, it is somewhat striking that the same valve 26 may be employed to use air both to expel seed and vermiculite and that the seed will become effectively buried in or buried beneath the vermiculite even though both are dispensed approximately at the same time in accordance with the present invention.

Due to the fact that no mechanical metering devices are used near the ground, and that there are no considerable moving parts near the ground, abrasion and wear do not become problems. Further, dirt is not a maintenance problem. One of the reasons for this is that valve 26, by controlling compressed air, in effect is self-cleaning.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

I claim:

1. A dispensing apparatus for intermittently and simultaneously expelling separate discrete measured quantities of granular material, comprising:

a source of pressurized gas;

automatically operable valve means connected to said source of pressurized gas; and first and second dispensing units;

said first dispensing unit comprising: a firs generally horizontally extending dispensing tube having an open forward end through which material to be dispensed is expelled, and an open rear end operatively connected to said automatically operable valve means; and a first, generally vertically extending delivery tube having an open upper end adapted to be connected to a first supply of granular material to be dispensed, and an open lower end connected to said first dispensing tube between its said forward and rear ends and communicating with the interior thereof;

said second dispensing unit comprising a second dispensing tube having an open lower end through which material to be dispensed is expelled, and an open upper end operatively connected to said automatically operative valve means; and a second delivery tube having an open upper end adapted to be connected to a second supply of granular material to be dispensed, and an open lower end connected to said second dispensing tube;

whereby, when said automatically operable valve means is opened, communication will be simultaneously established between said source of pressurized gas and said first and second dispensing tubes to expel granular material in the said dispensing tubes.

2. In a planting machine comprising a chassis and a set of wheels for supporting said chassis for moving said chassis over the ground, the improvement comprising:

granular material storage means connected to said chassis; dispensing means for intermittently dispensing a discrete quantity of granular material from said storage means onto the ground; and means operatively connected between said granular material dispensing means and said chassis wheels for operating said dispensing means in response to the rotation of said wheels;

liquid supply means on said chassis; liquid dispersing means connected to said liquid supply means; pump means connected to said chassis wheels and operable in response to rotation of said wheels to pump liquid from said liquid storage means to said liquid dispensing means in response to rotation of said chassis wheels; and check valve means disposed between said liquid storage means and said pump means; said check valve means being normally biased closed to prevent leakage of liquid from said liquid storage means; said check valve being operable by said pump means to permit the pumping of liquid from said liquid storage means to said liquid dispensing means;

said granular material dispensing means being spaced from said liquid dispensing means; and means operatively connected to said chassis wheels for operating said pump means to intermittently dispense liquid on discrete quantities of granular material dispensed onto the ground by said granular material dispensing means.

* * * * *